United States Patent Office 3,461,077
Patented Aug. 12, 1969

3,461,077
PHOTOSENSITIVE SLURRY AND METHOD OF PREPARING THE SAME
Yoshichika Kobayashi, Koji Yakeno, and Masanori Takagawa, Osaka, Japan, assignors to Matsushita Electronics Corporation, Osaka, Japan, a corporation of Japan
Filed Oct. 30, 1967, Ser. No. 678,875
Claims priority, application Japan, Nov. 1, 1966, 41/72,489; Apr. 11, 1967, 42/23,772
Int. Cl. C09k 1/02, 1/52, 1/54
U.S. Cl. 252—301.3           4 Claims

ABSTRACT OF THE DISCLOSURE

Photosensitive slurry for use in making color picture tubes and consisting of polyvinyl alcohol, ammonium dichromate and phosphor particles is improved as to chemical stability and higher sensitivity against ultraviolet rays for printing on picture tube screens, by the addition thereto of a small amount of germanium dioxide or suitable germanium dioxide-yielding compound. By this addition the photosensitivity of the slurry to ultraviolet rays is improved to attain a value as much as 2.6 times that of conventional slurries, and the slurry acquires such a stability that it can be left as long as 150 hours without impairing its chemical characteristics.

This invention relates to an improved photosensitive slurry specially intended for use in making phosphor dots of a color picture tube.

A phosphor screen of a color picture tube comprises a number of three color groups, i.e., blue, green and red, of phosphor dots regularly arranged thereon. These dots are printed by the so-called photoengraving method, utilizing the photohardening character of photosensitive resin.

The procedure in the said photohardening method is as follows:

The phosphor slurry is first prepared by dispersing phosphor particles into a solution substantially consisting of aqueous solution of polyvinyl alcohol, to which, for photosensitization, ammonium dichromate is added.

Phosphors, for instance, yttrium phosphors which are mentioned in copending applications Ser. No. 513,205, filed Dec. 13, 1965, and Ser. No. 515,083, filed Dec. 20, 1965, can be employed.

The slurry is then applied on the inner surface of the face-plate of a picture tube by the flow-coating method, being then dried to form a layer. The layer is exposed to ultraviolet rays coming through a shadow-mask inserted into the tube. By developing the light-exposed layer by washing away unexposed parts thereof, phosphor dots are printed on the inner surface of the face-plate. Dots of three color phosphors are completed by repeating the above-described procedure three times. The printing processes described above are substantially those described in the article in pp. 122–169, No. 1 (March 1955), vol. 16, RCA Review.

In the said conventional slurry made by mixing photosensitive solution and phosphor particles, the hydrogen exponent (hereinafter referred to as pH) increases with lapse of time. This increase of pH causes a change of the photosensitive dichromate ions into non-photosensitive chromate ions, resulting in reduction or disappearance of the photosensitivity of the slurry. Thus the slurry will finally become chemically unstable. Besides, in case of slurries including the recently developed phosphors of the type of europium-activated yttrium oxide, of europium-activated gadolinium oxide, of solid solutions thereof and/or of yttrium oxysulfide, i.e., in case of slurries including rare earth oxide phosphors and/or rare earth oxysulfide phosphors, the said reduction or disappearance is especially conspicuous.

In the case of a slurry including zinc sulfide phosphors or zinc-cadmium sulfide phosphors the reduction or disappearance phenomena are also observed, albeit to a lesser extent.

In the case of a conventional photosensitive slurry including europium-activated yttrium oxide phosphor, europium-activated gadolinium oxide phosphor or europium-activated yttrium oxysulfide phosphor, an adverse phenomenon is observed when the slurry is put aside for hours. That is, in the slurry, the chromium ions included as photo-sensitive material are adsorbed onto surfaces of the phosphor particles as time lapses; and this adsorption of chromium ions impairs the radiating ability of the phosphor, i.e., causes the so-called killer effect.

Elimination of these two drawbacks, i.e., the reduction of photosensitivity of the slurry to ultraviolet ray exposure in dot printing, and the impairment of radiating ability of the phosphor after the baking, is indispensible to successful industrial exploitation.

This invention is aimed at embodying a photosensitive slurry for use in making color picture tubes.

This invention offers improved photosensitive slurries including polyvinyl alcohol and ammonium dichromate, characterized in that the slurry includes as additive a small quantity of germanium dioxide, germanium tetrachloride, germanium disulfide or ortho-germanate ester.

The primary object of this invention is to obtain photosensitive slurries having high photosensitivity to ultraviolet ray exposure.

A further object of the invention is to impart to the phosphor slurry chemical stability against the lapse of time.

Another object of the invention is to obtain phosphor slurries from which phosphor dots having very bright radiation against electron-beam excitation are available.

According to the present invention, the chemical stabilities of phosphor slurries including europium-activated yttrium oxide, europium-activated gadolinium oxide and/or europium-activated yttrium oxysulfide are greatly improved by the addition of a slight amount of germanium dioxide or such germanium compound as germanium tetrachloride, germanium disulfide or ortho-germanate ester, i.e., compounds of the type that form germanium dioxide through hydrolysis. In addition to the improvement in the chemical stabilities of the slurries, the said addition of germanium compound to the slurry considerably increases the photosensitivities of the phosphor slurries to ultraviolet ray exposure.

Referring to the accompanying drawings.

Figure 1:
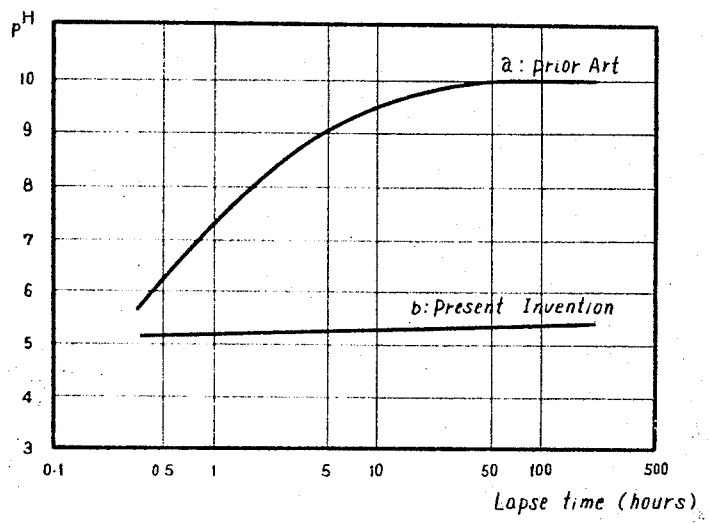
FIG. 1 is a chart showing the relation between the lapse of time from the preparation of the slurry and the hydrogen exponent (pH) of the slurry. In the chart, curve a shows the relation in a prior art slurry including rare earth phosphor, and curve b relates to the slurry of Example 1, infra.

According to the present invention, stability of the slurry against the lapse of time improves when, as aforesaid, certain kinds of germanium compounds are added to the slurries. Germanium dioxide, and also germanium compounds of the type which hydrolyze to form germanium dioxide, such as germanium tetrachloride, germanium disulfide and ortho-germanate ester, are effective as additives. Slurries containing such additives show very little change in pH against the lapse of time after the preparation of the slurries. In FIG. 1, curve $a$ shows changes of pH in a conventional slurry, prepared by suspending about 25 grams of red phosphor particles of europium-activated yttrium oxide and 2.0 milliliters of 20% ammonium dichromate aqueous solution in 100 milliliters of 5% aqueous polyvinyl alcohol solution and by thorough stirring thereof. As will be clearly understood from the curve $a$, the pH in the conventional slurry changes from 5.5, the value immediately after the preparation, to 10, that at 150 hours later.

In accordance with the increase of pH in the lapse of time, photo-sensitive dichromate ions change into non-photosensitive chromate ions, consequently making the slurry non-sensitive to ultraviolet ray exposure in the lapse of time. Therefore, a conventional photosensitive slurry has to be prepared immediately before use. Efficiencies in the field of industrial applications employing the conventional slurry have been low owing to the said drawback. On the contrary, the slurry embodying the present invention shows no change of pH, cf. curve $b$ in FIG. 1. Accordingly, the slurry of the present invention shows no decrease in photosensitivity to ultraviolet ray exposure. 250 grams of europium-activated yttrium oxide red phosphor and 2.5 grams of germanium dioxide are suspended in 1000 milliliters of 5% solution of polyvinyl alcohol and stirred well. Next, 20 milliliters of 20% solution of ammonium dichromate is added, and the mixture is stirred for 10 minutes. The slurry embodying the present invention, made by the above processes, does not change its pH value even after 150 hours from its preparation, and consequently the slurry has such a good performance that no decrease in photosensitivity to ultraviolet rays is observed.

Figure 2:
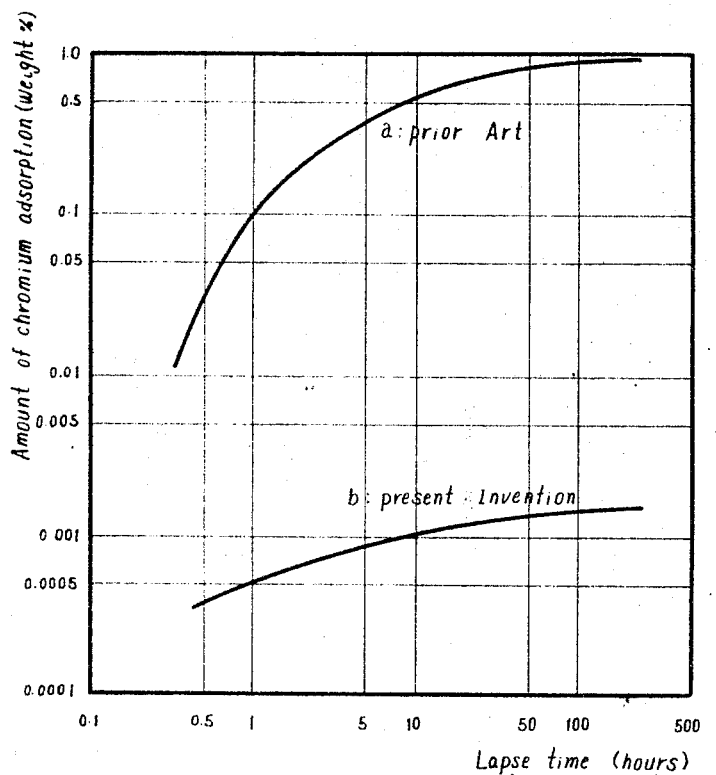
FIG. 2 is a chart showing the relation between the lapse time from the preparation of a slurry including rare earth oxide phosphor and amount of chromium adsorbed onto the phosphor particles. In this chart, curve a corresponds with the prior art, and curve b with the said Example 1.
Figure 3:
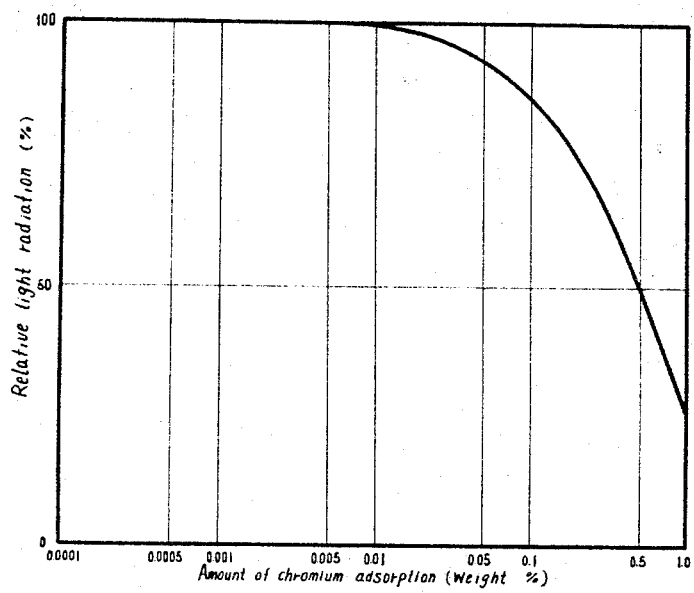
FIG. 3 is a chart showing the relation between chromium adsorption onto the phosphor particles and the change of light radiation from europium-activated yttrium oxide phosphor or europium-activated gadolinium oxide phosphor under electron-beam excitation.

In FIG. 2, curve $a$ shows the relation between the elapsed time and the amount of chromium adsorption onto the phosphor particles of the above-described conventional slurry. Referring to curve $a$ of FIG. 2, it is seen that in the conventional slurry chromium ions are generally adsorbed onto the surfaces of the phosphor particles in the lapse of time, consequently accumulating chromium ions to as much as 1.0% of the weight of phosphor particles. The adsorbed chromium ions diffuse into the phosphor particles during the baking process, which is necessary for removing polyvinyl alcohol by decomposition. The said diffusion of the ions causes a quenching effect, or the so-called killer effect. This is explained by FIG. 3, which is a chart showing the relation between chromium adsorption and relative light radiation of the above-mentioned europium-activated yttrium oxide phosphor. The chart shows that when the chromium adsorption exceeds 0.01%, the relative radiation rapidly falls. Therefore, the conventional slurry has to be prepared immediately before use in order to get a color picture tube having a phosphor screen of high radiation. This restriction in preparation of the conventional slurry has been a drawback in manufacturing efficiency. This drawback can be greatly mitigated by adopting the present invention. Curve $b$ in FIG. 2 shows characteristics of the above-mentioned slurry according to Example 1 of the present invention. In this case, the chromium adsorption amounts only to 0.002%, even after 150 hours from the preparation of the slurry, which is far less in comparison with the conventional slurry even just after preparation. Therefore, a phosphor screen made from a slurry of the present invention can exert 100% of its radiation ability even after a long lapse of time from its preparation, as shown by FIG. 2 and FIG. 3. Besides, no coloring of any phosphor particle itself, nor any spectrum shift in the radiation, is observed, and consequently, a great industrial usefulness can be achieved.

Figure 4:
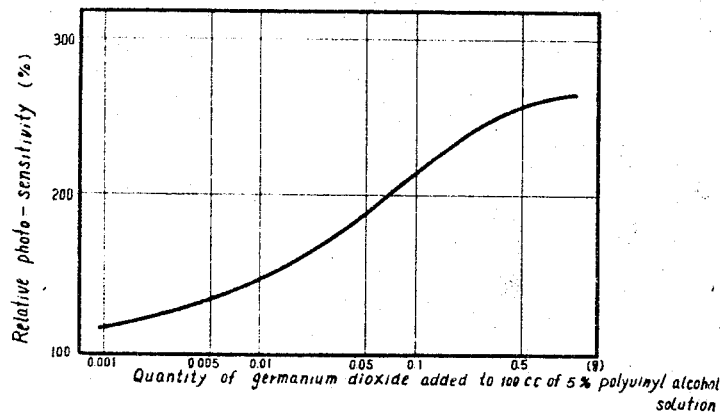
FIG. 4 is a chart showing the relation between the amount of germanium dioxide added to a slurry and the relative photosensitivity of a film made from the said slurry and attached on the inner surface of the face-plate of a picture tube screen, when exposed to ultraviolet rays.

The slurry of the present invention is also excellent in photosensitivity to ultraviolet ray exposure, in comparison with the conventional slurry. FIG. 4 is a chart drawn by plotting photosensitivities of the photosensitive film including polyvinyl alcohol against additions of germanium dioxide, by means of measurement utilizing optical wedges. In this case, various amounts of germanium dioxide are added to 100 milliliters of 5% aqueous polyvinyl alcohol solution containing ammonium dichromate and europium-activated yttrium oxide phosphor, generally employed as photosensitive slurry. The sensitivity in the chart is represented by the relative sensitivity, the ratio between each individual sensitivity and the sensitivity of the slurry without addition of germanium dioxide. For instance, as is clear from the chart, the slurry prepared by adding 0.25 gram of germanium dioxide to 100 milliliters of 5% aqueous polyvinyl alcohol solution shows an increase of sensitivity as high as 2.4 times, as compared with the slurry without addition of germanium dioxide.

Figure 5:
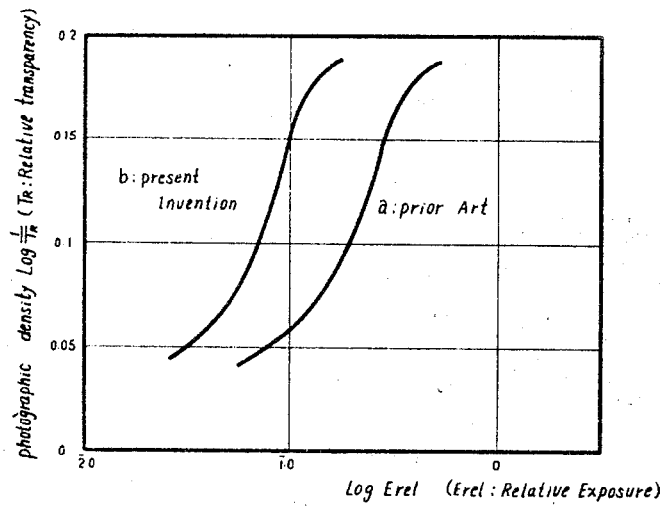
FIG. 5 is a chart showing the characteristic curves of a film made from a slurry; in the chart the photographic density, the logarithm of reverse of the relative transparency of the film, is plotted against the logarithm of the exposure to the ultraviolet rays. In the chart, curve $a$ corresponds to the prior art, and curve $b$ to Example 1.

For a photosensitive resin film usable for a color picture tube, contrast as well as photosensitivity is an important feature. If the contrast is low, clearness of outlines of phosphor dots is deteriorated. In FIG. 5, the contrasts of the films made from the slurries are represented by tangents of the curves. As shown by curve $b$ of FIG. 5, the contrast of the photosensitive resin film which contains germanium dioxide is substantially the same as that of the conventional one excluding germanium dioxide which is represented by curve $a$. In addition no reverse change in viscosity of the photosensitive resin, nor harmful influence on dispersion of the particles when phosphor powder is mixed in it, is observed. Moreover, no reverse phenomenon occurs in the present slurry. A range of the germanium dioxide addition of 0.001–1.25 grams for 100 milliliters of 2–10% aqueous polyvinyl alcohol solution is suitable. That is, with an addition less than the said 0.001 gram of the germanium dioxide, no increase of photosensitivity can be observed; and with an addition exceeding the said 1.25 grams of germanium dioxide, the germanium dioxide remains undissolved among the phosphor particles. Within the said range of germanium dioxide addition, the most optimum range for increasing the sensitivity is 0.05–0.5 gram of germanium dioxide for 100 milliliters of 2–10% polyvinyl alcohol solution.

Moreover, the same results can be obtained by replacing the germanium dioxide by a germanium compound which hydrolyzes to form germanium dioxide, as, e.g., germanium tetrachloride, germanium disulfide, or ortho-germanate ester. In case of use of a germanium compound, the additive quantity should be equivalent mol percent to that of the germanium dioxide additive.

As the amount of ammonium dichromate increases, the photosensitivity increases; on the other hand, killer effect increases. Consequently the amount of ammonium dichromate in the slurry should be in the range between 1 and 30% in weight of the said polyvinyl alcohol.

As is described above, by employing the present invention, the characteristics of phosphor slurries containing red rare earth oxide phosphors or rare earth oxysulfide phosphors are improved prominently, while even slurries containing sulfide compounds and rare earth vanadate oxide phosphors are also improved in stability and photosensitivity of the slurry, as shown in the embodiments described hereafter.

The following are illustrative examples of presently preferred embodiments of the present invention.

EXAMPLE 1

| | |
|---|---|
| 5% aqueous polyvinyl alcohol solution _____milliliters__ | 1000 |
| Europium-activated yttrium oxide phosphor _____grams__ | 250 |
| Germanium dioxide (soluble) _____do____ | 2.5 |

The foregoing starting materials are blended in a ball mill for 60 minutes, then 20 milliliters of 20% ammonium dichromate aqueous solution is added to the mixture, and the mixture is further blended for 10 minutes. The slurry is applied onto the inner surface of the face-plate of a picture tube and dried to form a resin film on the surface. The film is exposed to ultraviolet rays, for instance of a conventional high pressure mercury vapor lamp, and then developed by water rinsing, after which photosensitivity is measured. The photosensitivity of the film made from the present slurry is as high as 2.4 times that of the conventional slurries; in addition, the pH of the slurry does not change substantially even after a long lapse of time as shown by curve $b$ in FIG. 1, and no deterioration of the photosensitivity to ultraviolet rays can be observed. Even after a lapse of 150 hours, the chromium adsorption does not exceed 0.002% in weight of the phosphor, and radiation strength and radiation spectrum also do not change. Consequently, picture tubes can be manufactured perfectly with a slurry which has been put aside for as long as 150 hours.

EXAMPLE 2

This is an example in which saturated meta-germanic acid solution was employed as an additive, which acid is formed by dissolving germanium dioxide in water, to the extent of saturation.

| | |
|---|---|
| 10% polyvinyl alcohol solution (aqueous) _____milliliters__ | 600 |
| Europium-activated gadolinium dioxide phosphor _____grams__ | 300 |
| Saturated meta-germanic acid solution _____milliliters__ | 400 |

The foregoing starting materials are well blended in a ball mill, then 20 milliliters of 20% ammonium dichromate aqueous solution is added to the mixture, and the mixture is further blended to form a slurry. A color picture tube comprising red phosphor screen dots in the screen is made using the slurry. In applying the phosphor screen, the flow-coating method is employed, and remaining slurry is reclaimed and blended with virgin slurry. Even after repetitions of the said procedures for a week, characteristics of pH to photosensitivity, and characteristics of radiation from the phosphor screen made with the slurry by applying, drying, developing and baking it, are substantially equivalent with that of virgin slurry, i.e., the slurry right after the preparation.

EXAMPLE 3

| | |
|---|---|
| 5% aqueous polyvinyl alcohol solution _____milliliters__ | 1000 |
| Europium-activated yttrium-gadolinium oxide phosphor $(Y_{0.8}Gd_{0.2})_2O_3$ _____grams__ | 250 |
| Ethoxy germanium _____milliliters__ | 4.5 |
| 20% ammonium dichromate aqueous solution _____do____ | 20 |

The foregoing starting materials are well blended, and applied onto the inner surface of the face-plate of a picture tube by the flow-coating method to form a phosphor screen. In manufacturing, the process identical with that of Example 2 is employed. The phosphor screen of the picture tube thus manufactured shows satisfactory radiation characteristics. The slurry thus used for one week shows no deterioration in characteristics of photosensitivities, and also no impairment of radiation from a phosphor screen made therewith, even after baking of the tube at such a high temperature as 400° C.

EXAMPLE 4

| | |
|---|---|
| 5% aqueous polyvinyl alcohol solution _____milliliters__ | 1000 |
| Zinc-cadmium sulfide phosphor for green emission _____grams__ | 250 |
| Germanium dioxide (soluble) _____do____ | 1 |

The foregoing materials are blended in a ball mill for 60 minutes, then 12 milliliters of 20% ammonium dichromate aqueous solution is added to the mixture, and the mixture is further blended for 10 minutes to form slurry. A phosphor screen is made with the slurry. The slurry has an equivalent photosensitivity to ultraviolet rays to that of the slurry prepared by increasing said ammonium dichromate solution up to 20 milliliters, in 1000 milliliters of 5% aqueous polyvinyl alcohol solution, and excluding germanium dioxide. A picture tube made by using the said slurry after the latter has been put aside for 150 hours shows satisfactory characteristics of radiation.

EXAMPLE 5

| | |
|---|---|
| 5% polyvinyl alcohol solution (aqueous) _____milliliters__ | 1000 |
| Europium-activated yttrium vanadate _____grams__ | 250 |
| Germanium disulfide _____do____ | 1 |
| 20% ammonium dichromate aqueous solution _____milliliters__ | 12 |

The foregoing starting materials are blended for 60 minutes. The phosphor screen of a color picture tube is formed by using the slurry including the foregoing materials. The photosensitivity of the slurry thus prepared is equivalent to that of a slurry prepared by increasing said ammonium dichromate solution up to 20 milliliters, in 1000 milliliters of 5% aqueous polyvinyl alcohol solution, and excluding the addition of germanium dioxide. The slurry is stable even after being put aside for as long as 150 hours. A picture tube made by using the phosphor slurry put aside for 150 hours shows satisfactory radiation characteristics.

EXAMPLE 6

| | |
|---|---|
| 5% polyvinyl alcohol solution (aqueous) _____milliliters__ | 1000 |
| Europium-activated yttrium oxide phosphor _____grams__ | 250 |
| Ethanol containing 20% of germanium tetrachloride _____milliliters__ | 14.5 |
| 20% ammonium dichromate aqueous solution _____do____ | 12 |

The foregoing materials are blended for 60 minutes to form a slurry. The phosphor screen of a color picture tube is formed by using the said slurry. The slurry is as stable as the one shown in Example 1. In addition, photosensitivity to ultraviolet ray exposure of the film made with the slurry is increased to as high as 2.2 times that of the slurry excluding the germanium tetrachloride. This effect is caused by the existence of germanium dioxide formed by hydrolysis of the germanium tetrachloride solution.

EXAMPLE 7

| | |
|---|---|
| 5% polyvinyl alcohol solution (aqueous) _____milliliters__ | 1000 |
| Europium-activated yttrium oxysulfide phosphor _____grams__ | 250 |
| Germanium dioxide (soluble) _____do____ | 2.5 |

The foregoing raw constituents are blended in a ball mill for 60 minutes, then 20 milliliters of 20% ammonium dichromate aqueous solution is added to the mixture, and the mixture is further blended for 10 minutes. Photosensitivity of the film made from the slurry is as high as 2.4 times that of the conventional slurries and, in addition, the pH of the slurry does not change substantially even after a long range of time, and no deterioration of the photosensitivity to ultraviolet rays can be observed. Even after a lapse of time of 150 hours, the chromium adsorption does not exceed 0.002% in weight of the phosphor, and neither radiation strength nor radiation spectrum change. Consequently, picture tubes can be manufactured perfectly even with a slurry which has been put aside for as long as 150 hours.

As is manifest from the foregoing descriptions, this invention makes it possible to stabilize slurries for use in the manufacture of television color picture tubes, and makes it possible to prevent deterioration of radiation characteristics of these phosphors by decreasing chromium adsorption onto the phosphor particles. In addition, the invention makes possible shortening of ultraviolet ray exposure time of the slurries, owing to the increase of the sensitivity of the photosensitive resin by addition of the germanium dioxide. In other words, with the addition of germanium dioxide, the amount of ammonium dichromate can be considerably decreased for equivalent photosensitivity, while decreasing the chromium content, which is harmful in deteriorating phosphor radiation; consequently, improvement of the quality of the color picture tubes can be achieved.

For europium-activated phosphors, see e.g., Electrochemical Society Journal, vol. III, page 311.

The ethoxy germanium hereinbefore mentioned can be replaced, if desired, by a corresponding amount of another lower alkoxy germanium, as, e.g., methoxy germanium.

What is claimed is:
1. A photosensitive slurry including polyvinyl alcohol, ammonium dichromate and phosphor particles, said slurry containing, as stabilizing additive, an effective quantity of germanium compound selected from the group consisting of germanium dioxide, germanium tetrachloride, germanium disulfide and ortho-germanate ester.
2. A photosensitive slurry according to claim 1, in which the phosphor is a rare earth compound phosphor selected from the group consisting of europium-activated yttrium oxide, europium-activated gadolinium oxide, europium-activated yttrium-gadolinium oxide, europium-activated yttrium oxysulfide and europium-activated gadolinium oxysulfide.
3. A photosensitive slurry according to claim 1, in which the concentration of the polyvinyl alcohol is between 2 and 10% in weight, and the amount of germanium compound additive is between 0.001 and 1.25 grams, calculated as germanium dioxide, per 100 milliliters of the said polyvinyl alcohol solution.
4. A photosensitive slurry according to claim 2, in which concentration of the polyvinyl alcohol is between 2 and 10% in weight, and the amount of the germanium compound additive is between 0.001 and 1.25 grams, calculated as germanium dioxide, per 100 milliliters of the said polyvinyl alcohol solution.

References Cited
UNITED STATES PATENTS

| | | | |
|---|---|---|---|
| 2,769,733 | 11/1956 | Pool | 117—211 |
| 2,996,380 | 8/1961 | Evans | 96—35 |

TOBIAS E. LEVOW, Primary Examiner

A. P. DEMERS, Assistant Examiner

U.S. Cl. X.R.

96—36; 117—335